Oct. 16, 1951 — W. V. OFFUTT — 2,571,476
FLUID MIXING SYSTEM
Filed Nov. 19, 1947 — 2 Sheets-Sheet 1
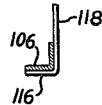
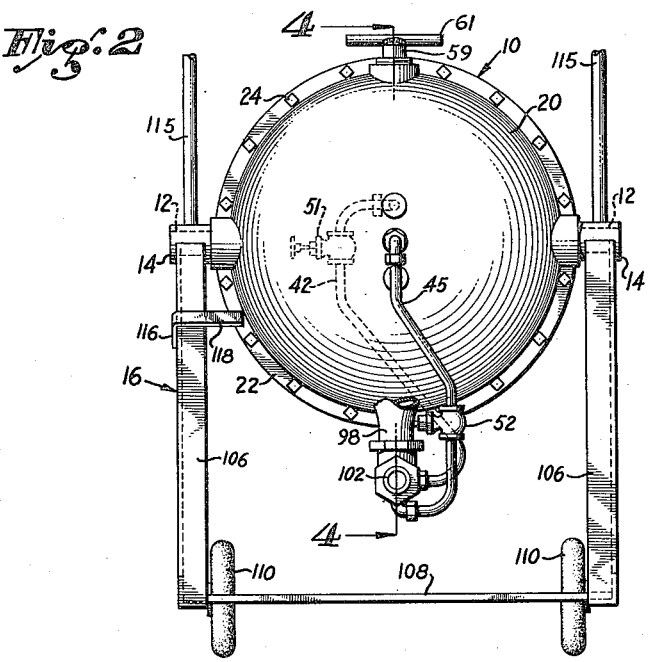
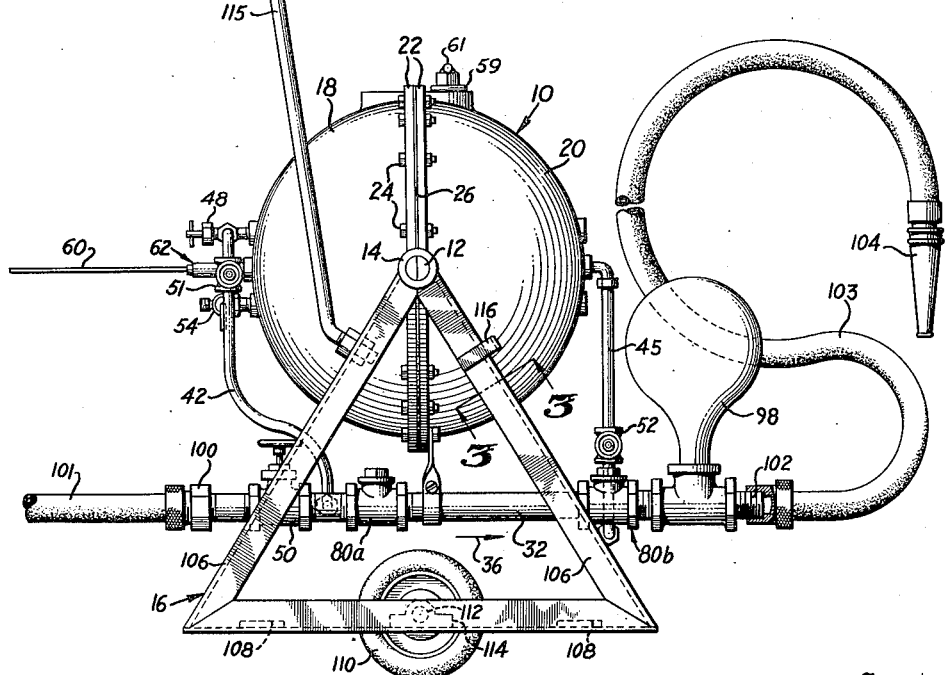
Inventor:
WILLIAM V. OFFUTT.
By Reed B. Lawlor
AGENT.

Oct. 16, 1951 W. V. OFFUTT 2,571,476
FLUID MIXING SYSTEM
Filed Nov. 19, 1947 2 Sheets-Sheet 2
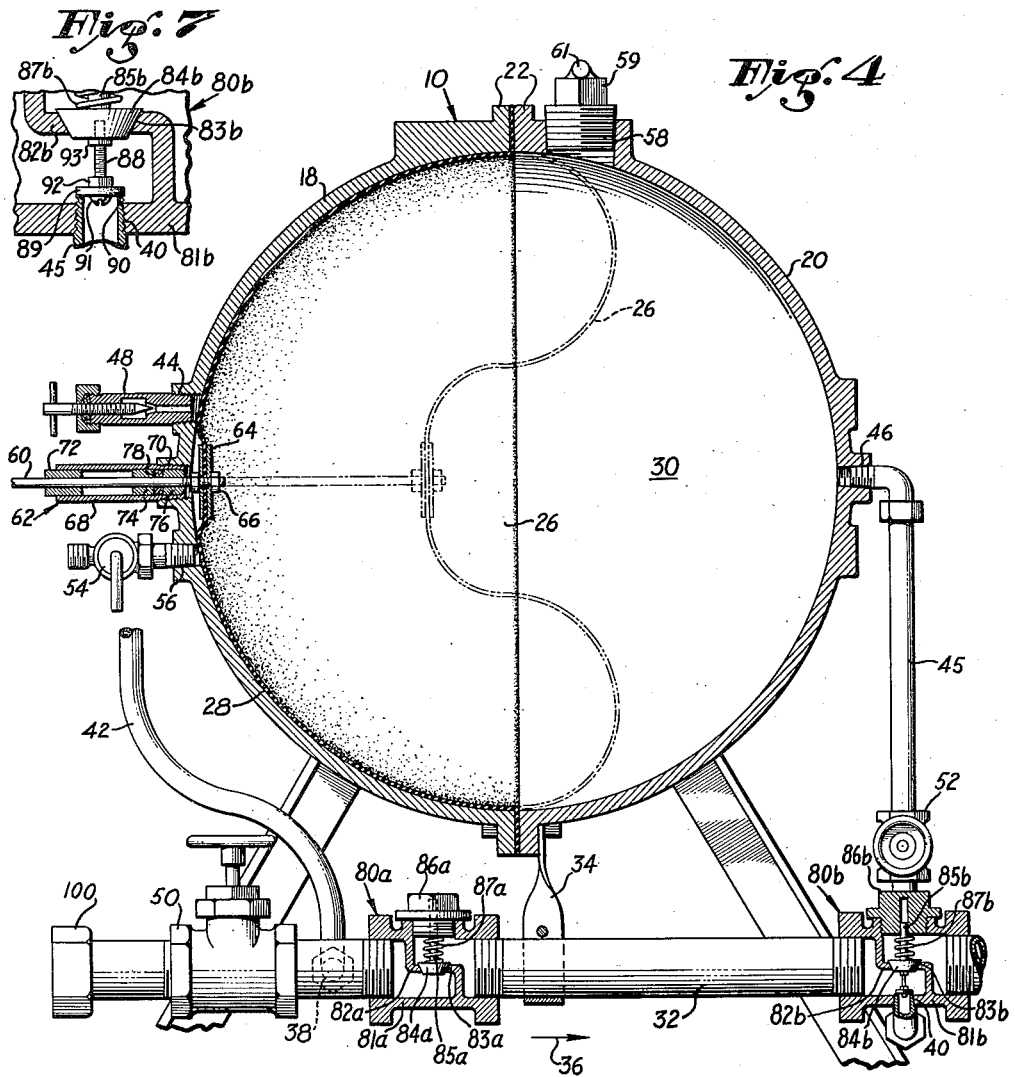
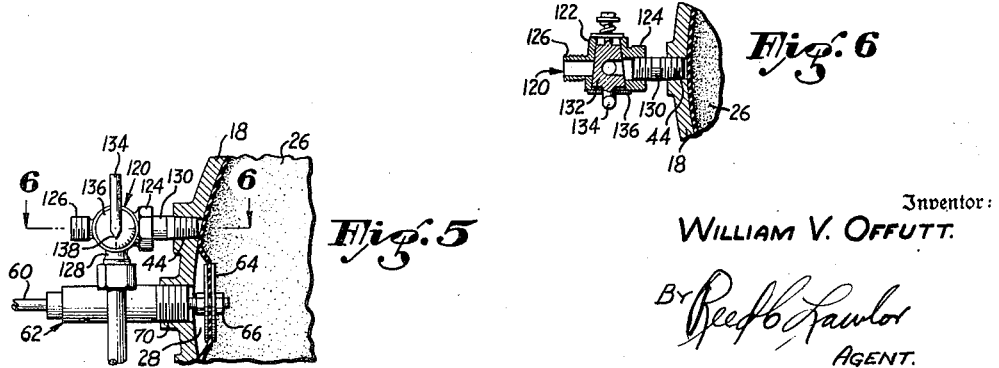
Inventor:
WILLIAM V. OFFUTT.
By Reef C. Lawlor
AGENT.

Patented Oct. 16, 1951

2,571,476

UNITED STATES PATENT OFFICE 2,571,476

FLUID MIXING SYSTEM

William V. Offutt, Downey, Calif.

Application November 19, 1947, Serial No. 786,971

8 Claims. (Cl. 299—85)

My invention relates to systems for mixing chemicals and particularly to a system for injecting a liquid solute into a liquid solvent in constant proportions. While my invention is applicable to the injection of any liquid solute into any liquid solvent, it possesses special utility in connection with the mixing of liquid fertilizer with water during irrigaton. For this reason, my invention is described and illustrated herein with particular reference to its use as a liquid fertilizer dispenser.

A liquid fertilizer dispenser of the type to which my invention is particularly applicable comprises a vessel which is separated by a flexible diaphragm into a water chamber and a liquid fertilizer chamber. An inlet to the water chamber is connected by means of a water line to a first branch opening of a main flow line or pipe at a relatively upstream position thereof. And an outlet in the liquid fertilizer chamber is connected by means of a dispensing line to a second branch opening at a relatively downstream position of the main pipe. Between the two branch openings, there is generally provided some means such as a constriction for creating a differential pressure on opposing sides of the diaphragm as water flows through the main pipe. With such an arrangement when water flows downstream through the main pipe, the excess pressure on the upstream side of the constriction causes water to flow from the main pipe through the water line into the water chamber and liquid fertilizer to flow out of the fertilizer chamber through the dispensing line into the main pipe where it is dissolved in water which is then delivered to ground being irrigated.

An object of my invention is to provide an improved fluid mixing system of the type described above which causes two fluids to be continuously mixed in uniform proportions over a wide range of flow rates of the solvent and under a wide variety of conditions.

Another object of my invention is to provide an improved mixing system of the type described which employs a minimum number of working parts located where they are subject to the corrosive action of the solute being injected into the main pipe.

Another object of my invention is to provide an improved mixing system of the type described which may be easily refilled without discontinuing the flow of solvent through the main flow line.

Still another object of my invention is to provide such a mixing system which is readily isolated from the main flow pipe.

And still another object of my invention is to provide an improved liquid fertilizer dispenser of the type described which is portable.

*Main features*

One feature of my invention resides in the provision of a manually adjustable throttle valve in the water line and an indicator rod which extends slidably through a guide member in the wall of the water chamber. The throttle valve is employed to regulate the flow of water into the water chamber and hence the rate of injection of liquid fertilizer into the water flowing into the main pipe. The indicator rod is attached to the diaphragm and is used to indicate the amount of liquid fertilizer remaining in the fertilizer chamber. By mounting the throttle valve and the indicator rod on the water side of this diaphragm, the wear of these parts is minimized, since in these positions they are not subject to corrosion by the liquid fertilizer.

Another feature of my invention resides in the employment of a self-adjusting valve between the two branch openings. To appreciate the value of employing a self-adjusting valve at this point, it must be borne in mind that the frictional resistance to movement of the indicator rod in its guide member and the frictional resistance to the movement of the diaphragm must be overcome before the diaphragm is displaced to inject liquid fertilizer into the main line. The self-adjusting valve also has the property of opening in increasing amounts in accordance with the pressure of water on its upstream side. Inasmuch as it is normally closed and opens gradually as this pressure increases, the main pipe on the upstream side is maintained full of water even though the rate of flow of water through the valve is very slow. The self-adjusting valve is preferably arranged to be normally closed and to open concurrently with the inception of injection of liquid fertilizer, that is, with the inception of movement of the indicator rod and the diaphragm. Maintenance of a positive water pressure on the water line even at very low water flow rates, assures the injection of liquid fertilizer into the water line at a substantially constant proportion over a wide range of pressures and water flow rates.

Another feature of my invention resides in the provision of a check-valve and an air-dome on the downstream side of the dispensing line. These two elements cooperate to minimize the transmission of shock waves to the dispensing line that occur, for example, when a hose attached to the downstream side of the main pipe is jerked to move it from one position to another. By attenuating these shock waves, the tendency that they would otherwise have to vary the rate of injection of liquid fertilizer into the lines is minimized. Experimentally it is found that without this feature of my invention, such waves sometimes cause liquid fertilizer to be injected in such excessive amounts that there is danger of burning plants as the mixture is applied.

Another feature of my invention resides in the employment of a shut-off valve at the mouth of the second branch opening which closes automatically when flow of water through the main pipe is suspended. This shut-off valve thus acts to close the dispensing line at that time thus preventing the diffusion of excessive amounts of liquid fertilizer into the main line while no water is flowing therethrough.

Another feature of my invention resides in the provision of one shut-off valve in the main pipe upstream from the first lateral opening and another in the dispensing line and still another in the water line. The shut-off valve in the dispensing line is employed to prevent the injection or diffusion of any liquid fertilizer into the main line when it is desired to irrigate ground without fertilizing. The shut-off valves are employed to isolate the water chamber and the liquid fertilizer chamber completely from the main water pipe when it is desired to re-fill the liquid fertilizer chamber.

Another feature of my invention resides in the provision of a convenient arrangement for rotatably mounting the liquid fertilizer dispenser on a carriage to facilitate re-filling the liquid fertilizer chamber.

The foregoing and other objects, features, and advantages of my invention will appear more fully from reading the following detailed description in connection with the accompanying drawing illustrating one embodiment of my invention.

While my invention is described herein with particular reference to liquid fertilizer dispensers, it is to be understood that my invention is not limited thereto but that its scope is to be determined by reference to the appended claims.

In the drawings:

Figure 1 is a side elevational view of a liquid fertilizer dispenser embodying the features of my invention;

Fig. 2 is an end elevational view of the liquid fertilizer dispenser;

Fig. 3 is a detail view taken on the plane 3—3 of Fig. 1;

Fig. 4 is a fragmentary sectional view of the liquid fertilizer dispenser taken on the plane 4—4 of Fig. 2;

Fig. 5 is a detailed fragmentary view of an alternative valve arrangement;

Fig. 6 is a sectional view of the valve of Fig. 4 taken on the plane 6—6 of Fig. 5, and Fig. 7 is a detail view of one of the valves.

*Description of fertilizer dispenser*

The liquid fertilizer dispenser illustrated in Figs. 1 to 4 inclusive comprises a vessel 10 rotatably mounted by means of split trunnions 12 in bearings 14 at the top of a carriage 16. The vessel 10 is of spherical configuration being formed of two hemispherical shells 18 and 20 having external equatorial flanges 22 by means of which they are firmly clamped together with the aid of bolts 24. A diaphragm 26 is firmly secured at its periphery between the flanges 22. The diaphragm 26 is preferably composed of rubber or other flexible material and is molded to conform to the inner wall of either of the hemispherical shells 18 and 20. The diaphragm 26 separates the vessel 10 into a water chamber 28 and a liquid fertilizer chamber 30.

A main pipe 32 is supported beneath the vessel 10 by means of a strap 34. Water, into which liquid fertilizer is to be injected in a predetermined proportion, flows in this pipe in the direction indicated by the arrow 36. The pipe 32 is provided with a first branch, or lateral, opening 38 at a relatively upstream position beneath the first shell 18 and a second branch, or lateral, opening beneath the second shell 20. A water or pressure line 42 connects the first lateral opening 38 with a water inlet 44 adjacent the pole of the first hemispherical shell 18. A dispensing line 45 connects the second branch opening 40 with a liquid fertilizer outlet 46 at the pole of the second hemispherical shell 20.

A calibrated needle valve 48 is included in the pressure line 42 at the inlet 44 of the vessel 10. A shut-off valve 50 is mounted in the main pipe 32 at a position upstream from the first branch opening 38. A shut-off valve 51 is mounted in the pressure line 42 and another shut-off valve 52 is mounted in the dispensing line 45. A normally closed dump valve 54 is mounted in an auxiliary opening 56 adjacent the pole of the first shell 18 and in communication with the water chamber 28. A filler port 58 is arranged at the uppermost part of the second shell 20 in communication with the liquid fertilizer chamber 30. A threaded plug 59 carrying a handle 61 is used to close the filler port 58. An indicator rod 60, which is connected at its innermost end to the center of the diaphragm 26 by means of discs 64 and nuts 66, extends through a guide member 62 arranged at the pole of the first shell 18. The guide member 62 includes a stub pipe 68 threaded into an opening 70. One ring-guide or collet-bearing 72 is press-fit in the outer end of the stub pipe 68 and a pair of such bearings 74 and 76 are press-fit in spaced apart relation in the inner end of the stub pipe 68. The three bearings 72, 74, and 76 serve to pilot the rod 60 inwardly and outwardly of the vessel 10. An O-ring 78 arranged between the two innermost bearings 74 and 76 is employed to seal the guide member 62 against leakage of water.

A first spring loaded check-valve 80a is mounted in the main line 32 between the two lateral openings 38 and 40. A second spring loaded check-valve 80b is mounted in the main line 32 at a position which, in effect, is downstream from the second lateral opening 40. The first check-valve 80a is provided with a first straight body 81a possessing a first longitudinally disposed separating wall 82a in which a first conical valve seat 83a is arranged. A first tapered valve head 84a guided by means of a first stem 85a slidably piloted in a first screw-cap 86a is urged transversely into the first valve seat 83a by means of a first concentric helical spring 87a. Similarly the second check-valve 80b is provided with a second straight body 81b possessing a second longitudinally disposed separating wall 82b in which a second conical valve seat 83b is arranged. A second tapered valve head 84b guided by means of a second stem 85b slidably piloted in a second screw-cap 86b is urged transversely into the second valve seat 83b by means of a second concentric helical spring 87b.

Preferably the second lateral passage 40 is located in the body 81b of the second check-valve 80b concentrically with its valve seat 83b on the upstream side thereof, that is on the side opposite its screw-cap 86b. As most clearly shown in Fig. 7, a threaded rod or bolt 88 screwed into the lower face of the second valve head 84b carries at its lower extremity a rubber washer 89 which is adapted to seat in the outlet 90 of the dispensing line 45 when the second check-valve 80b closes. The washer 89 is firmly held at the lower end of the rod 88 between an enlarged head 91 thereon and a nut 92. The threaded rod 88 is preferably held in a fixed position on the second valve head 84b by means of a lock-nut 93. Preferably the washer 89 has an external diameter slightly less than the opening encircled by the valve seat 83b so as to facilitate assembly and adjustment of the second check-valve 80b.

An air-dome 98 is connected to the upper side of the main pipe 32 at a position slightly downstream from the second check-valve 80b.

A threaded coupling 100 is arranged at the upstream end of the main pipe 32 for connection to a water hose 101 which connects to a water supply faucet (not shown). The other end 102 of the main pipe 32 is threaded to receive a dispensing hose 103 at the farthermost end of which an adjustable spray nozzle 104 is usually connected.

The carriage 16 is of simple construction comprising a pair of equilateral triangular side wall frames 106, the bases of which are firmly connected by a pair of mutually spaced crossbars 108. A pair of wheels 110 are suitably mounted on the carriage by means of an axle 112 and bearings 114. A handle 115 having its opposite ends applied to the frames 106 is used for pushing the carriage 16. A right-angle bracket 116 having an inwardly projecting arm 118 is welded to the side of one of the triangular frames 106 nearest the second shell 20. The arm 118 projects inwardly of the carriage 16 sufficiently far to engage one of the equatorial flanges 22 when the vessel 10 is rotated in the bearings 14 so as to limit the downward movement of the indicator rod 60.

*Preparation of dispenser for use*

In order to prepare my fertilizer dispenser for use the shut-off valve 51 or the valve 50 or both of these valves are closed; the dump valve 54 is opened; the shut-off valve 52 is closed; the plug 59 is removed; and the vessel 10 is tilted in the carriage 16 to permit discharge of water from the water chamber 28 through the dump valve 54. While in this condition, liquid fertilizer from an auxiliary supply tank (not shown) is fed through the filler port 58 into the liquid fertilizer chamber 30. As liquid fertilizer is fed into the filler port 58, the diaphragm 26 is moved away from the second shell 20 and toward the first shell 18, thus forcing water to be discharged from the water chamber 28 through the dump valve 54. Simultaneously, the indicator rod 60 slides outwardly through the guide member 62. After the fertilizer chamber 30 has been expanded to fill the entire vessel 10, the plug 59 is replaced taking special precaution to minimize the quantity of air trapped in the fertilizer chamber 30. The shut-off valve 54 is then closed and the dispenser is ready for use.

*Use of dispenser*

In order to use this liquid fertilizer dispenser, the needle valve 48 is set to a position corresponding to the proportion of liquid fertilizer which it is desired to mix with water flowing through the main line 32. Then the two shut-off valves 50 and 52 are opened and the rate of flow of water through the main line 32 is regulated as desired by means of the faucet to which the supply hose 101 is connected or by means of the valve 50 or by means of the nozzle 104 at the end of the dispensing hose 103. As water flows through the main pipe 32 both check-valves 80a and 80b are opened and the washer 89 is lifted off its seat. When water is flowing, a substantial differential pressure exists across the first check-valve 80a causing the pressure of water in the pipe 45 to be lower than that in the pipe 42.

As a result, when water flows through the pipe 32, the diaphragm 26 is displaced at a rate corresponding to the difference in pressure of water on opposite sides of the first check-valve 80a and to the setting of the needle valve 48. As the diaphragm 26 is displaced the water chamber 28 expands and the liquid fertilizer chamber 30 contracts an equal amount. It is to be noted however, that the pressure differential must be sufficient to overcome the friction existing between the indicator rod 60 and the guide member 62 and the internal viscosity of the material forming the diaphragm 26 before the chamber 28 expands and the chamber 30 contracts permitting liquid fertilizer to flow freely through the dispensing line 45 into the main pipe 32. According to my invention, the check-valve 80a is loaded by the spring 87a in such an amount that the check-valve 80a opens at the same minimum pressure required to cause the liquid fertilizer to flow through the dispensing line 45. The second check-valve 80b is preferably loaded to open at about the same pressure or lower. The check-valve 80a opens more and more as the pressure increases in the main pipe 32 on the upstream side thereof. In this way, the main pipe 32 is maintained full of water on the upstream side even though the pressure is very low. As a result, the upstream portion of the main pipe 32 and the pressure line 42 are maintained full of water at all times during use, so that even at such low pressure, a positive force is applied to displace the diaphragm 26 and to force liquid fertilizer into the main pipe.

Thus, it can be seen that with this arrangement, the amount of liquid fertilizer injected into the water at the second branch opening 49 is proportioned automatically to the rate of flow of water into the main line 32 so that the concentration of liquid fertilizer in the water being used for irrigation is practically the same both at high and at low rates of water flow, even though the water pressure present at the upstream side of the check-valve 80a is very low and even though the spray nozzle 104 is throttled almost to shut-off. In any case, the particular concentration attained depends upon the setting of the calibrated needle valve which is located in the pressure line 42.

If for some reason the dispensing hose 103 is jerked, a shock wave is transmitted backward toward the main pipe 32. With the present arrangement, this shock wave is attenuated by means of the air-dome 98 and any residual pressure component is rectified by the automatic closure of the second check-valve 80b. By this means, the tendency of such shock waves to create excessive concentrations of liquid fertilizer in the water used for irrigation is reduced.

Occasionally it becomes desirable to throttle the irrigating nozzle to shut-off. When this occurs, flow of water through the two check-valves 80a and 80b is suspended, and they are closed automatically by means of the loading springs 87a and 87b. When they are thus closed, the outlet 90 of the dispensing line 46 is also closed so that no liquid fertilizer diffuses into the main line 32 while no water is flowing.

Occasionally too, it is desired to irrigate ground without the addition of any liquid fertilizer to the irrigating water. In order to accomplish this purpose, the shut-off valve 52 in the dispensing line 45 is closed. The amount of liquid fertilizer which can flow into the irrigating water while the shut-off valve 52 is closed, is minimized by mounting this valve as close as practical to the second branch opening 40.

When all of the liquid fertilizer contained in the chamber 30 has been discharged therefrom, the vessel 10 may be recharged through the flow port 58 in the manner hereinbefore described.

Alternative forms

In Figs. 5 and 6 there is illustrated an alternative embodiment of my invention in which the needle valve 48 and the dump valve 54 are replaced by a single two-way valve 120. This valve includes a T-shaped body having two aligned side-arms 124 and 126 and a transverse arm 128. The side-arm 124 is connected to the inlet 44 by means of a short pipe 130 and the transverse arm 128 is connected to the pressure line 42. The valve 120 also includes a tapered cock 132 having a T-shaped passage therein. The cock 132 may be turned by means of a handle 134 so as to provide an adjustable opening between the pressure line 42 and the inlet 44 in order to regulate the flow of water into the water chamber 28. The cock 132 may also be rotated so as to provide communication between the passages in the two side-arms 124 and 126 in order to permit water to be discharged from the water chamber 28 during a filling operation. Preferably, a dial 136 is mounted on the body 122 of valve 120 and is calibrated in accordance with the concentration of liquid fertilizer injected into the water at various settings of the handle 134. The concentrations may be readily indicated by means of a pointer 138 projecting from one side of the handle 134 and overlying the dial 136.

From the foregoing description of my invention, it can be readily seen that I have provided an improved liquid dispenser which facilitates the injection of a liquid solute into a liquid solvent at a substantially uniform concentration into a flow line at different rates of flow of solvent therethrough. Furthermore, the liquid dispenser embodying my invention is of relatively simple construction and is adaptable for different uses according to the desires of the operator.

Since many changes could be made in the detailed construction of this liquid dispenser, as will readily occur to those skilled in the art, I wish it to be understood that my invention is not limited to the exact details of construction shown and described, but my invention may be embodied in many forms falling within the scope of the appended claims.

I claim:

1. In a liquid mixture dispenser having wall structure defining a closed vessel, a movable member separating said vessel into first and second chambers, an inlet and an outlet in said vessel communicating respectively with said first and second chambers, liquid forced into said inlet acting to displace said movable member to change the relative sizes of said chambers whereby liquid solute contained in said second chamber is forced out of said outlet, a flow pipe adapted to carry fluid in a stream from one end thereof to the other end thereof and having a first branch opening at a relatively upstream position and a second branch opening at a relatively downstream position, both said branch openings lying between said pipe ends, and means defining first and second passages respectively connecting said first and second branch openings with said inlet and said outlet, the improvement which comprises the combination therewith of: a self-adjusting valve connected in said flow pipe between said two branch openings, said self-adjusting valve including means defining an orifice and means operating in opposition to the pressure of liquid on the upstream side thereof for opening the valve when such pressure exceeds a predetermined amount, the degree of opening increasing with the amount of such pressure in excess of said predetermined amount.

2. In a liquid mixture dispenser having wall structure defining a closed vessel, a movable member separating said vessel into first and second chambers, an inlet and an outlet in said vessel communicating respectively with said first and second chambers, liquid forced into said inlet acting to displace said movable member to change the relative sizes of said chambers whereby liquid solute contained in said second chamber is forced out of said outlet, a flow pipe adapted to carry fluid in a stream from one end thereof to the other end thereof and having a first branch opening at a relatively upstream position and a second branch opening at a relatively downstream position, both said branch openings lying between said pipe ends, and means defining first and second passages respectively connecting said first and second branch openings with said inlet and said outlet, the improvement which comprises the combination therewith of: a self-adjusting valve connected in said flow pipe between said two branch openings, said self-adjusting valve including means defining an orifice and means operating in opposition to the pressure of liquid on the upstream side thereof for opening said orifice an amount that increases with increase in pressure.

3. A liquid mixture dispenser as described in claim 2 comprising an adjustable throttle valve arranged in one of said passages for regulating the proportional rate of injection of liquid from said second chamber through said second opening into said pipe, and a handle external to said passage connected to said throttle valve for adjusting the degree of opening of said throttle valve to a fixed value independently of the rate of flow of liquid through said pipe.

4. In a liquid mixture dispenser having wall structure defining a closed vessel, a movable member separating said vessel into first and second chambers, an inlet and an outlet in said vessel communicating respectively with said first and second chambers, liquid forced into said inlet acting to displace said movable member to change the relative sizes of said chambers whereby liquid solute contained in said second chamber is forced out of said outlet, a flow pipe having a first branch opening at a relatively upstream position and a second branch opening at a relatively downstream position, and means defining first and second passages respectively connecting said first and second branch openings with said inlet and said outlet, the improvement which comprises the combination therewith of: a first check-valve connected in said main flow pipe between said two branch openings, and a second check-valve operatively connected in said flow pipe on the downstream side of said second branch opening, said check valves being adapted to remain closed when only small pressures are applied thereto and to open by amounts that increase with higher excess pressures on the upstream sides thereof, and to confine solvent to a small volume in communication with said second branch opening when no solvent is flowing through said flow pipe.

5. A liquid mixture dispenser as described in claim 4 comprising an air-dome communicating with said pipe on the down-stream side of said second check-valve.

6. In a liquid mixture dispenser having wall structure defining a closed vessel, a movable member separating said vessel into first and second chambers, an inlet and an outlet in said vessel communicating respectively with said first and second chambers, a flow pipe adapted to carry fluid in a stream from one end thereof to the other end thereof and having a first branch opening at a relatively upstream position and a second branch opening at a relatively downstream position, both said branch openings lying between said pipe ends, means defining first and second passages respectively connecting said first and second branch openings with said inlet and said outlet, and pressure dropping means connected in said pipe between said first and second openings for creating a differential pressure across said movable member when solvent flows downstream in said pipe whereby solvent flows from said pipe through said first opening into said first chamber and solute contained in said second chamber is injected through said second opening into said pipe, the improvement which comprises the combination therewith of: a valve located in said second passage and means solely responsive to an increase in the pressure of liquid in said pipe adjacent said second branch opening for opening said second passage only when liquid is flowing in the pipe past said second branch opening.

7. In a liquid mixture dispenser having wall structure defining a closed vessel, a movable member separating said vessel into first and second chambers, an inlet and an outlet in said tank communicating respectively with said first and second chambers, a flow pipe having a first branch opening at a relatively upstream position and a second branch opening at a relatively downstream position, means defining first and second passages respectively connecting said first and second branch openings with said inlet and said outlet, and pressure dropping means connected in said pipe between said first and second openings for creating a differential pressure across said movable member when solvent flows downstream in said pipe whereby solvent flows from said pipe through said first opening into said first chamber and solute contained in said second chamber is injected through said second opening into said pipe, the improvement which comprises the combination therewith of: a loaded check-valve having a valve seat therein mounted downstream from said second branch opening, a first valve head arranged to seat in said valve seat, and a second valve head arranged to seat in said second branch opening, and means interconnecting said two valve heads whereby said valve heads operate in synchronism in response to fluid pressure acting on said first valve head for closing said second branch opening when no liquid is flowing through said main pipe.

8. A liquid mixture dispenser as described in claim 7 in which said valve seat and said second branch opening are coaxial and wherein said interconnecting means comprises a rod attached to said two valve heads.

WILLIAM V. OFFUTT.

REFERENCES CITED

The following references are of record in the file of this patent:

UNITED STATES PATENTS

| Number | Name | Date |
|---|---|---|
| 382,610 | Holmes | May 8, 1888 |
| 530,193 | Meuser | Dec. 4, 1894 |
| 637,250 | Hall | Nov. 21, 1899 |
| 1,875,022 | Krueger | Aug. 30, 1932 |
| 1,954,154 | Urquhart | Apr. 10, 1934 |
| 2,088,082 | Davis | July 27, 1937 |
| 2,142,947 | Kretzschmar et al. | Jan. 3, 1939 |
| 2,310,051 | Baer | Feb. 2, 1943 |
| 2,323,341 | McGill | July 6, 1943 |
| 2,474,512 | Bechtold et al. | June 28, 1949 |